US011644996B2

(12) United States Patent
Clark et al.

(10) Patent No.: US 11,644,996 B2
(45) Date of Patent: May 9, 2023

(54) FEEDBACK LOOPS IN DATA REPLICATION

(71) Applicant: International Business Machines Corporation, Armonk, NY (US)

(72) Inventors: Kim Julian Clark, London (GB); Robert B. Nicholson, Southsea (GB); Robert William Phippen, Romsey (GB); Brian Michael Petrini, Chula Vista, CA (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 16/699,973

(22) Filed: Dec. 2, 2019

(65) Prior Publication Data
US 2021/0165572 A1    Jun. 3, 2021

(51) Int. Cl.
*G06F 17/14* (2006.01)
*G06F 11/14* (2006.01)
*G06F 3/06* (2006.01)

(52) U.S. Cl.
CPC .............. *G06F 3/065* (2013.01); *G06F 3/067* (2013.01); *G06F 3/0611* (2013.01); *G06F 11/1448* (2013.01); *G06F 11/1466* (2013.01); *G06F 17/14* (2013.01)

(58) Field of Classification Search
None
See application file for complete search history.

(56) References Cited

U.S. PATENT DOCUMENTS

| 6,122,630 A | 9/2000 | Strickler | |
| 2005/0125430 A1* | 6/2005 | Souder | G06F 16/27 |
| 2006/0047713 A1 | 3/2006 | Gornshtein | |
| 2006/0200533 A1* | 9/2006 | Holenstein | G06F 16/273 |
| | | | 709/208 |
| 2010/0042793 A1 | 2/2010 | Awakura | |
| 2012/0109887 A1* | 5/2012 | Ziemann | G06F 16/955 |
| | | | 707/610 |
| 2015/0304417 A1 | 10/2015 | Tan | |

OTHER PUBLICATIONS

Jon William Toigo. The Holy Grail of Network Storage Management. 2004. Prentice Hall. pp. 158-162.*
Oracle. "9 Configuring Oracle GoldenGate for Active-Active High Availability." Nov. 2014. https://docs.oracle.com/goldengate/1212/gg-winux/GWUAD/wu_bidirectional.htm#GWUAD282.*
Oracle. "SCCP Loop Detection." Jun. 2019. https://docs.oracle.com/cd/F11875_01/docs.468/GTT/GUID-32AE1F15-17DC-4A97-A39E-C3C5EC3430AA.htm.*
Striim. "Bidirection replication." Dec. 27, 2019. https://www.striim.com/docs/en/bidirectional-replication.html.*

* cited by examiner

*Primary Examiner* — Nathan Sadler
(74) *Attorney, Agent, or Firm* — Brian D. Welle

(57) ABSTRACT

Candidate duplicate events are identified as they are executed via data replication within a distributed system. A periodicity of the identified candidate duplicate events is identified. In response to identifying the periodicity, a delay is introduced into execution of a first event related to the candidate duplicate event. A feedback loop of the distributed system is identified based on an observed delay in the timing of another event of the candidate duplicate events.

25 Claims, 4 Drawing Sheets

FEEDBACK LOOPS IN DATA REPLICATION

BACKGROUND

Aspects of the present disclosure relate to data replication. Data may be replicated across systems, for example to synchronize data across the systems. Data may be replicated to provide redundant collections, such as backup systems. In this way, if a first system that stores a set of data fails, a second system that is synchronized with that first system may be used to restore the data. Additionally, or alternatively, in some examples data may be replicated to provide local copies to improve accessibility. For example, central data may be synchronized with a plurality of remote systems, each of which are near locations at which this data will be processed. By providing a local copy of data that is synchronized with the central copy, analysts may utilize the data more quickly and efficiently.

SUMMARY

Aspects of the present disclosure relate to identifying a feedback loop in data replication, such as via a computer-implemented, a computer program product, a processing system, or a middleware system for identifying a feedback loop in data replication. For example, the computer-implemented method for identifying a feedback loop in data replication includes identifying candidate duplicate events in execution of the data replication. The method also includes identifying a periodicity of the identified candidate duplicate events. In response to identifying the periodicity, a delay is introduced into execution of a first event related to the candidate duplicate events. A feedback loop is then identified based on an observed delay in the timing of another event of the candidate duplicate events. This method may be configured to identify feedback loops without requiring unique fields that can be used to identify events of a feedback loop across systems of the distributed system. Aspects of the disclosure further relate to a system and computer program product that are configured to execute the above method.

In some examples, the method above further includes receiving fields that indicate the candidate duplicate events, and therein identifying the candidate duplicate events at least partially because these events include the received fields. By utilized received fields to identify the candidate duplicate events, aspects of the disclosure may be configured to improve an ability to detect feedback loops as described herein.

In some examples, the method may further include identifying the feedback loop based on the observed delay by comparing the observed delay in the timing of the another event of the candidate duplicate events with the delay introduced into the first event, and therein, based on the comparison result, determining the existence of a feedback loop. By identifying the feedback loop by the timing of events in this way, aspects of the disclosure may be configured to identify feedback loops even if these aspects of the disclosure are not uniquely tailored to the distributed system being monitored.

In some examples, the method may further include identifying the candidate duplicate events by obtaining a plurality of events relating to a predetermined resource. Once obtained, the method includes determining a set of events of the plurality of events, each event of the set of events comprising at least one field having the same value. The method may then include identifying the events of the set of events as candidate duplicate events. In this way, aspects of the disclosure may be configured to improve an ability to identify candidate duplicate events, therein improving an ability to detect subsequent feedback loops as described herein.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
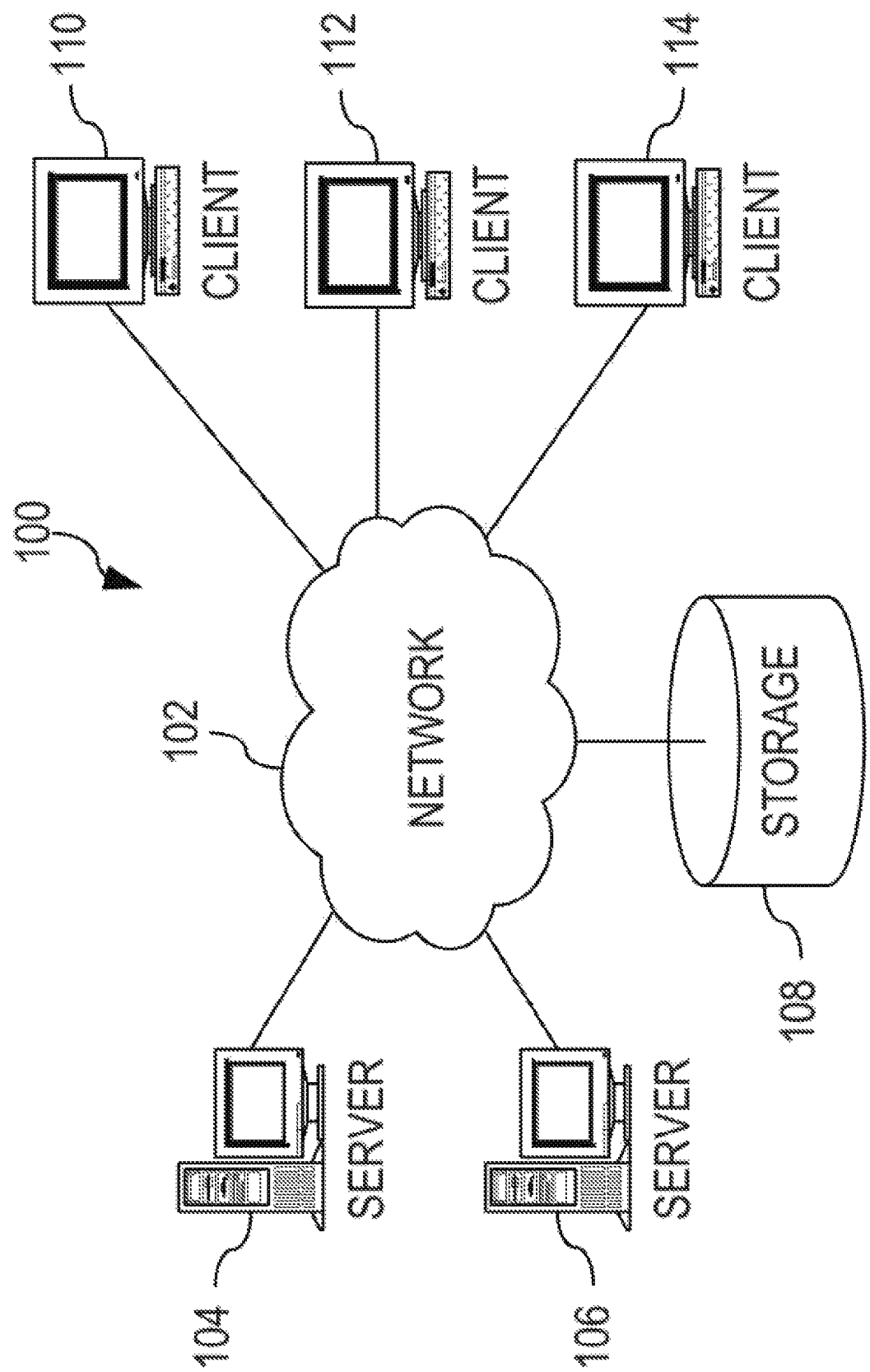
FIG. 1 depicts a conceptual diagram of an example distributed system in which aspects of the illustrative embodiments may be implemented.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to identifying feedback loops, more particular aspects relate to identifying feedback loops of candidate duplicate events across distributed systems via injected delays into the execute of these candidate duplicate events. While the present disclosure is not necessarily limited to such applications, various aspects of the disclosure may be appreciated through a discussion of various examples using this context.

In the context of the present disclosure, where embodiments relate to a method, it should be understood that such a method may be a process for execution by a computer (e.g., such that the method is a computer-implementable method). The various steps of the method may therefore reflect various parts of a computer program (e.g., various parts of one or more algorithms).

Also, in the context of the present disclosure, a system may be a single device or a collection of distributed devices that are configured to execute one or more aspects of the present disclosure. For instance, a system may be a personal computer (PC), a server, a collection of PCs and/or servers connected via a network, or the like. The network may include a local area network (LAN), the Internet, or the like, such that computing devices may be communicatively coupled across the network to execute one or more aspects of the present disclosure. Further, one or more operations described within this disclosure may be executed via an integration flow that is executed by one or more processing units of one or multiple computing systems.

Aspects of this disclosure relate to identifying a feedback loop in data replication. Identifying a feedback loop in data replication may provide for reliable detection of data change event feedback loops without detailed knowledge of their context. Embodiments may therefore enable remedial action to be taken to avoid and/or remove feedback loops.

For instance, aspects of the disclosure may enable a synchronization engine to determine that a system (e.g., a system that includes the synchronization engine) may have become part of a feedback loop. Conventional approaches typically require the existence of a data field that uniquely identifies each change being performed, such that once data is propagated through the entire loop the originating system may be able to recognize this returning event and therein stop the event. However, these unique fields may not also be present for each type of event, and even if they are present in the originating system they may not be present in other systems (such that when the event is propagating back to the originating system the event may no longer include the unique field). Aspects of this disclosure may reduce or eliminate a need for such data fields. Further, aspects of this disclosure may be applied to data replication or synchronization processes with minimal effort and/or without requiring a detailed understanding of surrounding context of the computing systems.

For example, aspects of this disclosure may alleviate or eliminate a need for change events passed between systems to have a unique event identifier. Aspects of this disclosure may alleviate or eliminate this need by identifying candidate duplicate events (e.g., by looking for related records between systems) and then executing a test in relation to the candidate duplicate events in order to confirm the presence of a loop. As used herein, candidate duplicate events may be events that aspects of the disclosure identify as probable or potential events that have been duplicated across systems, such that they warrant further investigation as described herein.

Toward this end, aspects of this disclosure relate to introducing an intentional delay within the execution of one of the candidate duplicate events, therein assessing an observed delay that is caused in this propagation of the candidate duplicate event(s). In other words, to confirm the presence of a feedback loop involving the candidate duplicate event, aspects of this disclosure introduce a deliberate delay into the execution (and therein, potentially the feedback loop propagation) of one of the events, therein monitoring how this candidate duplicate event is propagated. If, while monitoring the system, aspects of the disclosure detect an equivalent delay in the timing of the other related events, aspects of this disclosure may determine that some of these candidate duplicate events are in a feedback loop (e.g., continuously triggering further change events).

In some examples, aspects of this disclosure may execute one or more techniques to detect these loops. Aspects of the disclosure may relate to filtering some or all candidate duplicate events during initial monitoring. Subsequent to this initial monitoring, aspects of the disclosure may profile one or more events (e.g., such as time-based profiling) to identify periodicity (e.g., a time-based recursive period of events) associated with a possible loop. Aspects of the disclosure may further introduce intentional delays as disclosed herein to identify and discount potential false positives (e.g., candidate duplicate events that fit some of the parameters of a events of a feedback loop, but are determined to not part of a feedback loop). As mentioned above, taking such an approach may reduce or eliminate the need of a unique field for identifying each change event. It may also reduce or eliminate a need for a system to identify and correctly categorize some or all of a surrounding system context (e.g., such that a "generic" system may be used for substantially all systems, rather than requiring a tailored system for each system that is able to identify and categorize some or all events per the various functions of the system).

For example, aspects of the disclosure may identify a feedback loop in data replication by a method that includes identifying candidate duplicate events in execution of the data replication, determining a periodicity of the identified candidate duplicate events, introducing a delay into execution of a first event related to the candidate duplicate events in response to the determined periodicity meeting a predetermined requirement, and identifying a feedback loop based on an observed delay in the timing of another event of the candidate duplicate events resulting from the delay of the first event. Aspects of the disclosure may therefore dynamically and automatically identify feedback loops in data replication systems while also avoiding false positives.

Further, aspects of the disclosure may identify a feedback loop based on an observed delay by comparing an observed delay in the timing of another event of the candidate duplicate events with the delay introduced into execution of the first event. Based on the comparison result, the existence of a feedback loop may be determined. In this way, a simple and straightforward comparison methodology may be executed to identify a feedback loop, thus reducing the cost and complexity of embodiments.

Further, aspects of the disclosure may determine the existence of a feedback loop in response to the observed delay in the timing of another event substantially matching the delay introduced into execution of the first event. Determining an existence of a feedback loop in this way may reduce an associated cost and/or complexity of aspects of the disclosure in relation to conventional solutions for identifying feedback loops.

Further, aspects of the disclosure may identify a feedback loop based on an observed delay by comparing an observed delay in the timing of another event of the candidate duplicate events against a threshold value. In response to the observed delay in the timing of another event exceeding the threshold value, aspects of the disclosure may determine that a feedback loop exists. As such, aspects of the disclosure may be configured to identify and/or confirm the presence of a feedback loop based on a simple timing assessment process.

Further, aspects of the disclosure may identify candidate duplicate events by obtaining a plurality of events relating to a predetermined resource and determining a set of events of the plurality of events, where each of these events includes at least one field having the same value. The events of the set of events may be identified as candidate duplicate events. In this way, false positives may be removed, thus improving accuracy of detecting feedback loops.

In some examples, aspects of the disclosure may determine a periodicity of the identified candidate duplicate events by ordering the candidate duplicate events with respect to time. For example, for each pair of time-adjacent candidate duplicate events, aspects of the disclosure may determine a value of time separation between time-adjacent candidate duplicate events and determine a periodicity of the identified candidate duplicate events based on the determined values of time separation. Further, determining periodicity of the identified candidate duplicate events may include calculating an average value and standard deviation of the determined values of time separation. Alternatively, or additionally, determining periodicity of the identified candidate duplicate events may include calculating a value of periodicity of the identified candidate duplicate events based on a Fourier analysis of the determined values of time separation.

By way of example, the predetermined requirement may relate to a time difference between candidate duplicate events. Simple timing mechanisms may therefore be employed to identify candidate duplicate events for assessment.

Introducing a delay into execution of a first event may include delaying processing of the first event by a predetermined time delay. The predetermined time delay may be based on a time difference between candidate duplicate events.

Aspects of this disclosure may be implemented in conjunction with an existing data synchronization environment or application. In this way, the functionalities and/or utility of data replication environments/applications may be improved upon by incorporating aspects of this disclosure.

FIG. 1 depicts a pictorial representation of an example distributed system in which a data replication feedback loop may be identified. A distributed system 100 may include a network of computers in which aspects of the disclosure may be implemented. The distributed system 100 contains at least one network 102, which is the medium used to provide communication links between various devices and computers connected together within the distributed data processing system 100. The network 102 may include connections, such as wire, wireless communication links, or fiber optic cables. The network 102 may include a LAN, wide area network (WAN), the Internet, one or more intranets, or the like. Though only one centrally located network 102 is depicted in FIG. 1 for purposes of illustration, in other examples the distributed system 100 may include a plurality of different types of networks 102 communicatively coupling different computing systems of the distributed system 100.

In the depicted example, first server 104 and second server 106 are connected to the network 102 along with a storage unit 108. In addition, clients 110, 112, and 114 are also connected to the network 102. The clients 110, 112, and 114 may be edge devices, such as personal computers, network computers, Internet of Things (IoT) devices, or the like. In the depicted example, the first server 104 provides data, such as boot files, operating system images, and/or applications to one or more of the clients 110, 112, and 114. Clients 110, 112, and 114 are clients to the first server 104 in the depicted example. The distributed processing system 100 may include additional servers, clients, and other devices not shown.

In some examples, the distributed system 100 includes the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. As stated above, FIG. 1 is intended as an example, not as an architectural limitation for different embodiments of the present disclosure, and therefore, the particular elements shown in FIG. 1 should not be considered limiting with regard to the environments in which the illustrative embodiments of the present disclosure may be implemented.

Those of ordinary skill in the art will appreciate that the architecture and/or hardware in FIG. 1 may vary depending on the implementation. Also, the processes of the illustrative embodiments may be applied to a multiprocessor data processing system, without departing from the scope of the present disclosure.

As detailed above, aspects of the disclosure relate to a method and system for identifying a feedback loop in data replication. By way of further explanation, a proposed embodiment will now be described with respect to distributed communication system including a plurality of data systems that are configured to implement a data replication process which duplicates data across the data systems.

Figure 2:
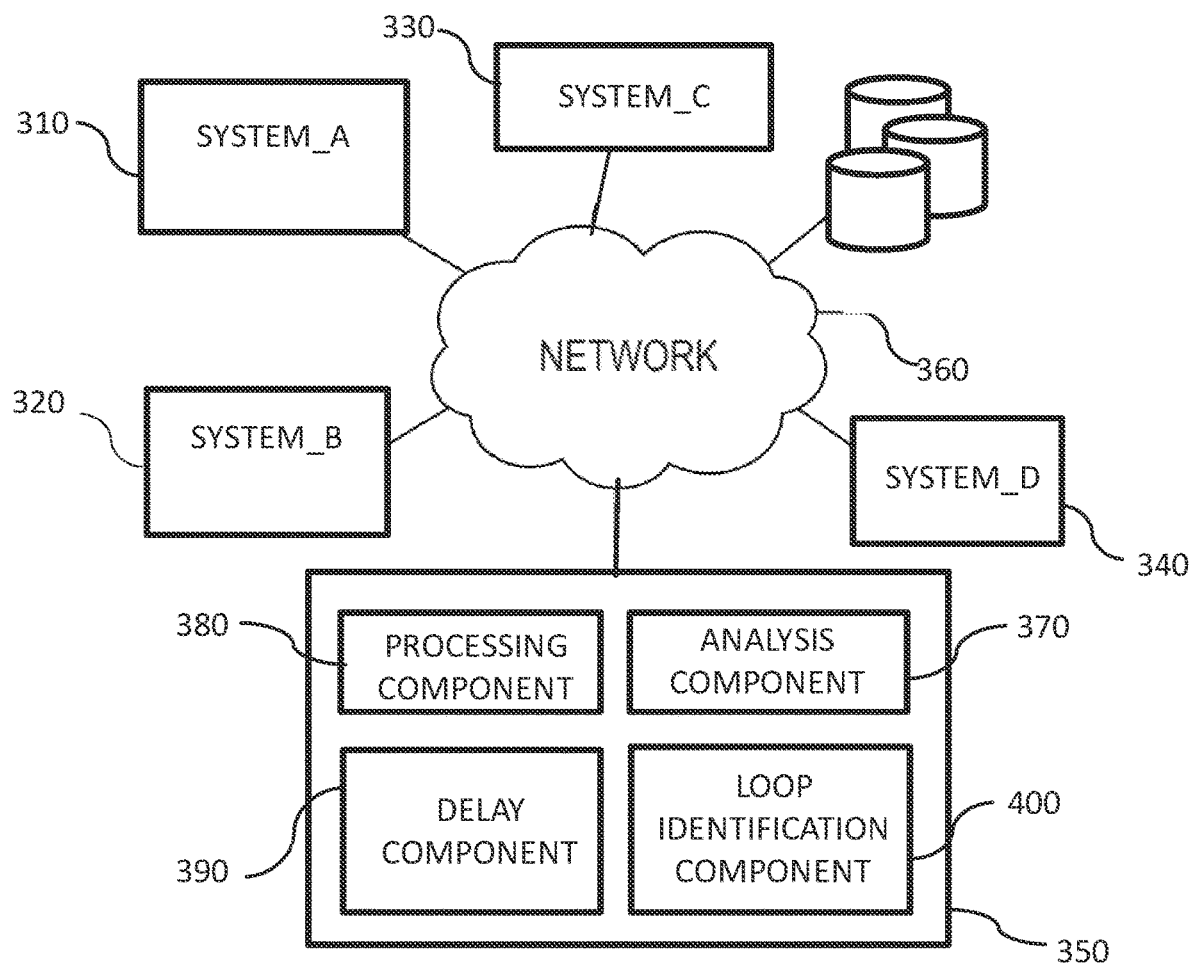
FIG. 2 depicts a box diagram of a proposed distributed communication system in which an example system can identify a feedback loop between two or more data systems.

Referring to FIG. 2, there is depicted a schematic diagram of a proposed distributed communication system of a data replication environment 300 according to aspects of this disclosure. The communication system includes a first data systems 310, second data system 320, third data system 330, and fourth data system 340, namely, SYSTEM_A, SYSTEM_B, SYSTEM_C and SYSTEM_D, respectively. The data systems 310-340 are configured to implement data replication so that data is duplicated across the data systems 310-340.

A system 350 is configured to identify a feedback loop in data replication across the data system 310-340 of the data replication environment 300 as described herein. The data systems 310-340 and the system 350 for identifying a feedback loop are communicatively coupled via a communication network 360 (e.g., the Internet), which may be similar to the network 102 of FIG. 1.

In the depicted example of FIG. 2, the system 350 for identifying a feedback loop includes a middleware system that is configured to intercept, monitor and control communications between the data systems 310-340.

The system 350 for identifying a feedback loop system includes an analysis component 370 that is configured to identify candidate duplicate events in execution of the data replication. The analysis component 370 may be configured to obtain a plurality of events relating to a predetermined resource and to determine a set of events of the plurality of events. For example, each event of the set of events may include a field having the same value. The analysis component 370 identifies the events of the set of events as candidate duplicate events.

A processing component 380 of the system 350 for identifying a feedback loop is configured to determine a periodicity of the identified candidate duplicate events. The processing component 380 may be configured to order the candidate duplicate events with respect to time (e.g., such that the order includes earlier-occurring events as "higher" or "lower" in the order than later-occurring events) and, for each pair of time-adjacent candidate duplicate events, to determine a value of time separation between time-adjacent candidate duplicate events. Based on the determined values of time separation, processing component 380 determines a periodicity of the identified candidate duplicate events.

Determining periodicity of the identified candidate duplicate events may include calculating an average value and standard deviation of the determined values of time separation. However, by way of further example, in alternative embodiments determining periodicity of the identified candidate duplicate events may include calculating a value of periodicity of the identified candidate duplicate events based on a Fourier analysis of the determined values of time separation.

The system 350 for identifying a feedback loop also comprises a delay component 390. The delay component 390 is configured to introduce a delay into execution of a first event related to the candidate duplicate events in response to the identified periodicity meeting a predetermined requirement (e.g., wherein the identified periodicity has at least a threshold amount of consistency or stability as executed across different data systems 310-340). The delay component 390 may be configured to delay processing of the first event by a predetermined time delay. By way of example, the time predetermined time delay may be based on a time difference between the identified candidate duplicate events.

A loop identification component 400 of the system 350 for identifying a feedback loop is configured to identify a feedback loop based on an observed delay in the timing of another event of the candidate duplicate events resulting from the delay of the first event. The loop identification component 400 may be configured to compare an observed delay in the timing of another event of the candidate duplicate events with the delay introduced into execution (and/or propagation) of the first event. Based on the comparison result, the loop identification component 400 is configured to confirm or reject the existence of a feedback loop. For example, the loop identification component 400 may determine that a feedback loop exists if the observed delay in the timing of another event substantially matches the delay introduced into the execution and/or propagation of the first event. As would be understood by one of ordinary skill in the art, this determination is based on the relative statistical certainty (e.g., where it can be at least 90% certain or 99% certain) that a delay of the first event caused a similar delay in another event, therein being indicative of those two events being in a feedback loop.

In other examples, the loop identification component 400 may compare an observed delay in the timing of another event of the candidate duplicate events with a predetermined threshold value. In such an example, the loop identification component 400 determines that a feedback loop exists if the observed delay in the timing of another event exceeds the threshold value.

Figure 3:
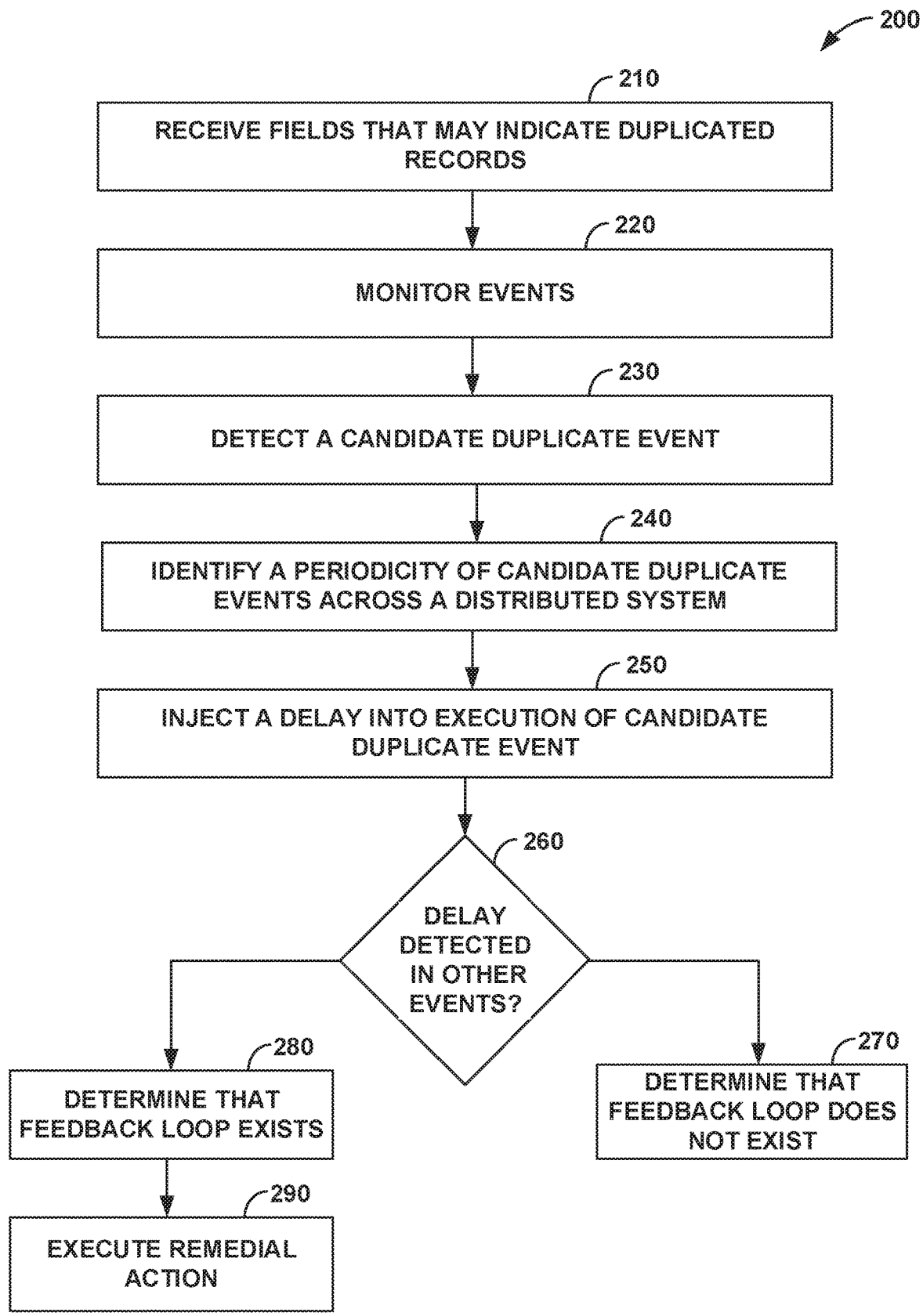
FIG. 3 depicts a flowchart of a method of the system of FIG. 2 identifying the feedback loop between the two or more data systems of FIG. 2.

For example, the system 350 may identify feedback loops according to the method 200 of FIG. 3. The method 200 of FIG. 3 is discussed with relation to the environment of FIG. 2 in which the system 350 monitors activity between data systems 310-340, though it is to be understood that the method 200 may be executed by different systems 350 on events of different data replication environments other than data replication environment 300 that includes data systems 310-340, and that further the system 350 may identify feedback loops according to different methods that are consistent with this disclosure other than method 200. The specific order and steps of method 200 may change, as in other examples the system 350 may identify a feedback loop with more or less steps, or similar steps in a different order.

In certain examples, a data replication environment 200 creates a stream of events as a result of data replication across various data systems 310-340. The system 350 may inspect this stream of change events so as to identify similarity between data in the events. In some examples, this may be assisted by an administrative user who is aware of fields that are relatively likely to be identical within a duplicated record.

This administrative user may provide a pool or stream of duplicate candidates (210). Each of these duplicate candidates may include multiple sets of records that occur more than once in the stream. The system 350 may still detect feedback loops as discussed herein even if this administrative user fails to identify some fields that could or should have been identified, though the system 350 may be relatively more likely to identify some events in a timely manner as a result of the administrative user identifying likely fields of candidate duplicate events.

The system 350 may then monitor events of the data systems 310-340 of the data replication environment 300 (220). Monitoring the events may include analyzing events (such as the events that include the fields provided by the administrative user) to identify periodicity. In other words, the system 350 may identify similar events that occur at regular intervals.

The system 350 may be identify candidate duplicate events (230). These candidate duplicate events may be events that have certain fields (e.g., the fields as provided by the administrative user), or occur at different times, or are either relatively rare (such that they can be tracked) or are relatively common (such that they may already be part of an undetected feedback loop). Once candidate duplicate events are detected, the system 350 may identify a periodicity of these candidate duplicate events (240). The system 350 may identify this periodicity as regular intervals at which substantially similar candidate duplicate events occur across data systems 310-340. Put differently, system 350 may identify a periodicity of the candidate duplicate events as similar events that occur at regular and/or consistent intervals, therein indicating (but may not necessarily confirm) that these events are duplicates and/or are caught in a feedback loop and will keep triggering one another. In this way, the system 350 may be configured to identify a "standing wave" between two or more of the data systems 310-340, wherein the same unique event passes through with similar time intervals therebetween. These duplicate candidate duplicate events may provide a set of "loop candidates."

The system 350 may then be configured to introduce a deliberate delay into the execution of the candidate duplicate event from the loop candidates (250), thereinafter monitoring if other events include this same delay (260). The system 350 may be configured to only confirm a feedback loop if other events have this delay and also have one or more similar fields. If no other events are detected that replicate this delay, the system 350 may confirm that a feedback loop does not exist (270). Conversely, if the system 350 detects similar events with this delay, the system 350 may therein confirm the presence of a feedback loop (280). The system 350 may confirm the feedback loop as a result of the similar timing of the duplicate event, where these events are part of a feedback loop continuously triggering further change events.

The system 350 may further be configured to execute one or more remedial actions (290). These remedial actions may be configured to stop the feedback loop. In some examples, the system 350 may notify one or more users of this feedback loop (e.g., via an email or pop-up alert or the like). In other examples, the system 350 may autonomously cease the execution of one or more of the candidate duplicate events to stop the feedback loop. Other examples of remedial actions as understood by one of ordinary skill in the art that are configured to stop a feedback loop are also possible.

In this way the system 350 may be configured to identify candidate duplicate events, and then delaying such candidate duplicate events to verify whether or not these candidate duplicate events are part of a feedback loop (e.g., therein subsequently confirming a feedback loop in response to observing subsequent delays of corresponding events on other systems). By only delaying candidate duplicate events (e.g., events that meet predetermined requirements that indicate they may be related via data duplication), the system 350 may greatly reduce the possibility of detecting a "false positive," which is to say an event that looks like a recurring change event in a loop, but in fact is not.

Figure 4:
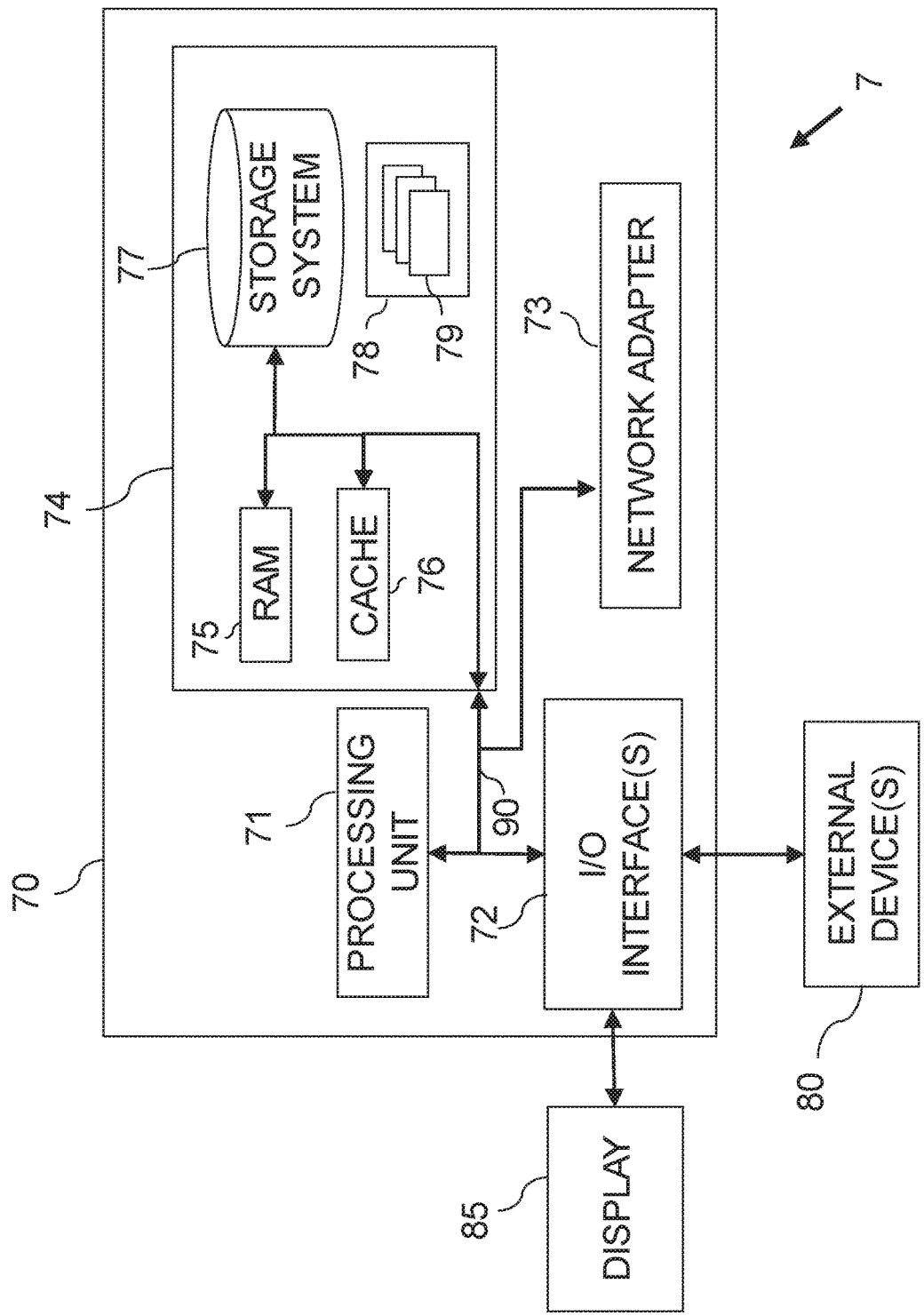
FIG. 4 depicts an example computer that is configured to identify a feedback loop in data replication.

The system 350 may comprise a computer system, such as the computer system 70 which may form part of a networked system 7 illustrated in FIG. 4. For instance, an analysis component configured to identify candidate duplicate events in execution of the data replication according to an embodiment may be implemented in the computer system 70 (e.g., as a processing unit 71). The components of computer system/server 70 may include, but are not limited to, one or more computing components, for example processors or processing units 71, a system memory 74, and a bus 90 that couples various system components. For example, as depicted bus 90 may couple system memory 74 to processing unit 71.

System memory 74 can include computer system readable media in the form of volatile memory, such as random-access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of feedback loop identification as discussed herein. For instance, the memory 74 may include a computer program product having program executable by the processing unit 71 to cause the Input/Output (I/O) interface 72 perform a method for identifying a feedback loop in data replication as discussed herein. Program/utility 78, having a set (at least one) of program modules 79, may be stored in memory 74. Program modules 79 generally carry out the functions and/or methodologies discussed herein for identifying a feedback loop in data replication.

Computer system/server 70 may also communicate with one or more external devices 80 such as a keyboard, a pointing device, a display 85, or the like, where these external devices 80 are configured to enable a user to interact with computer system/server 70. Computer system/server 70 may further utilize devices (e.g., network card, modem, etc.) that enable computer system/server 70 to communicate with one or more other computing devices. Such communication can occur via I/O interfaces 72. Computer system/server 70 can communicate with one or more networks such as a LAN, a WAN, and/or a public network (e.g., the Internet) via network adapter 73 (e.g., to identify feedback loops to devices of a distributed network).

In the context of the present disclosure, where some embodiments relate to a method, it should be understood that such a method may be a computer-implementable method. The steps of the method therefore reflect various parts of a computer program, e.g., parts of one or more algorithms.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, Python, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying candidate duplicate events in execution of data replication within a distributed system;
   identifying a periodicity of the identified candidate duplicate events;
   introducing, in response to identifying the periodicity, an intentional delay into execution of a first event related to the candidate duplicate events; and
   identifying a feedback loop of the distributed system based on an observed delay in the timing of another event of the candidate duplicate events.

2. The method of claim 1, wherein the identifying the periodicity of the identified candidate duplicate events includes determining that the periodicity meets a predetermined requirement.

3. The method of claim 2, wherein the predetermined requirement relates to a time difference between candidate duplicate events.

4. The method of claim 1, wherein the identifying the feedback loop based on the observed delay comprises:
   comparing the observed delay in the timing of the another event of the candidate duplicate events with the delay introduced into the first event; and
   based on the comparison result, determining the existence of a feedback loop.

5. The method of claim 1, wherein the identifying the feedback loop based on the observed delay comprises:
   comparing the observed delay in the timing of the another event of the candidate duplicate events with a threshold value; and
   in response to the observed delay in the timing of another event exceeding the threshold value, determining the feedback loop exists.

6. The method of claim 1, wherein the identifying the candidate duplicate events comprises:
   obtaining a plurality of events relating to a predetermined resource;
   determining a set of events of the plurality of events, each event of the set of events comprising at least one field having the same value; and
   identifying the events of the set of events as candidate duplicate events.

7. The method of claim 1, wherein the identifying the periodicity of the identified candidate duplicate events comprises:
   ordering the candidate duplicate events with respect to time;
   for each pair of time-adjacent candidate duplicate events, determining a value of time separation between time-adjacent candidate duplicate events; and
   determining a periodicity of the identified candidate duplicate events based on the determined values of time separation.

8. The method of claim 7, wherein the identifying the periodicity of the identified candidate duplicate events comprises calculating an average value and standard deviation of the determined values of time separation.

9. The method of claim 7, wherein the identifying the periodicity of the identified candidate duplicate events comprises calculating a value of periodicity of the identified candidate duplicate events based on a Fourier analysis of the determined values of time separation.

10. The method of claim 1, wherein the introducing the delay into execution of the first event comprises:
    delaying processing of the first event by a predetermined time delay, wherein the predetermined time delay is based on a time difference between candidate duplicate events.

11. A computer program product for identifying a feedback loop in data replication, the computer program product comprising a computer readable storage medium having program instructions embodied therewith, the program instructions executable by a computer to cause the computer to:

identify candidate duplicate events in execution of data replication within a distributed system;
identify a periodicity of the identified candidate duplicate events;
introduce, in response to identifying the periodicity, an intentional delay into execution of a first event related to the candidate duplicate events; and
identify a feedback loop of the distributed system based on an observed delay in the timing of another event of the candidate duplicate events.

12. The computer program product of claim 11, wherein the identifying the feedback loop based on the observed delay comprises:
comparing the observed delay in the timing of the another event of the candidate duplicate events with the delay introduced into the first event; and
based on the comparison result, determining the existence of a feedback loop.

13. The computer program product of claim 11, wherein the identifying the feedback loop based on the observed delay comprises:
comparing the observed delay in the timing of the another event of the candidate duplicate events with a threshold value; and
in response to the observed delay in the timing of another event exceeding the threshold value, determining the feedback loop exists.

14. The computer program product of claim 11, wherein the identifying the candidate duplicate events comprises:
obtaining a plurality of events relating to a predetermined resource;
determining a set of events of the plurality of events, each event of the set of events comprising at least one field having the same value; and
identifying the events of the set of events as candidate duplicate events.

15. A system for identifying a feedback loop in data replication, the system comprising:
a processor; and
a memory in communication with the processor, the memory containing instructions that, when executed by the processor, are configured to cause the processor to:
identify candidate duplicate events in execution of data replication within a distributed system;
identify a periodicity of the identified candidate duplicate events;
introduce, in response to identifying the periodicity, an intentional delay into execution of a first event related to the candidate duplicate events; and
identify a feedback loop of the distributed system based on an observed delay in the timing of another event of the candidate duplicate events.

16. The system of claim 15, wherein the identifying the periodicity of the identified candidate duplicate events includes determining that the periodicity meets a predetermined requirement.

17. The system of claim 16, wherein the predetermined requirement relates to a time difference between candidate duplicate events.

18. The system of claim 15, wherein instructions for identifying the feedback loop based on the observed delay further include instructions that, when executed by the processor, cause the processor to:
compare the observed delay in the timing of the another event of the candidate duplicate events with the delay introduced into the first event; and
based on the comparison result, determine the existence of a feedback loop.

19. The system of claim 15, wherein instructions for identifying the feedback loop based on the observed delay further include instructions that, when executed by the processor, cause the processor to:
compare the observed delay in the timing of the another event of the candidate duplicate events with a threshold value; and
in response to the observed delay in the timing of another event exceeding the threshold value, determine the feedback loop exists.

20. The system of claim 15, wherein instructions for identifying the candidate duplicate events further include instructions that, when executed by the processor, cause the processor to:
obtain a plurality of events relating to a predetermined resource;
determine a set of events of the plurality of events, each event of the set of events comprising at least one field having the same value; and
identify the events of the set of events as candidate duplicate events.

21. The system of claim 15, wherein instructions for identifying the periodicity of the identified candidate duplicate events further include instructions that, when executed by the processor, cause the processor to:
order the candidate duplicate events with respect to time;
for each pair of time-adjacent candidate duplicate events, determine a value of time separation between time-adjacent candidate duplicate events; and
determine a periodicity of the identified candidate duplicate events based on the determined values of time separation.

22. The system of claim 21, wherein instructions for identifying the periodicity of the identified candidate duplicate events further include instructions that, when executed by the processor, cause the processor to calculate an average value and standard deviation of the determined values of time separation.

23. The system of claim 21, wherein instructions for identifying the periodicity of the identified candidate duplicate events further include instructions that, when executed by the processor, cause the processor to calculate a value of periodicity of the identified candidate duplicate events based on a Fourier analysis of the determined values of time separation.

24. The system of claim 15, wherein instructions for introducing the delay into execution of the first event further include instructions that, when executed by the processor, cause the processor to:
delay processing of the first event by a predetermined time delay, wherein the predetermined time delay is based on a time difference between candidate duplicate events.

25. A computer-implemented method comprising:
receiving fields that indicate candidate duplicate events;
identifying candidate duplicate events that include the fields in execution of data replication within a distributed system;
identifying a periodicity of the identified candidate duplicate events;
introducing, in response to identifying the periodicity, an intentional delay into execution of a first event related to the candidate duplicate events; and identifying a feedback loop of the distributed system based on an observed delay in the timing of another event of the candidate duplicate events.

\* \* \* \* \*